US012615434B2

(12) United States Patent
Takei et al.

(10) Patent No.:    US 12,615,434 B2
(45) Date of Patent:    Apr. 28, 2026

(54) IMAGING GUIDANCE DEVICE, IMAGING GUIDANCE METHOD, AND PROGRAM

(71) Applicant: Panasonic Intellectual Property Management Co., Ltd., Osaka (JP)

(72) Inventors: Ichiro Takei, Tokyo (JP); Hiroki Taoka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 7 days.

(21) Appl. No.: 18/695,976

(22) PCT Filed: Aug. 24, 2022

(86) PCT No.: PCT/JP2022/031800
    § 371 (c)(1),
    (2) Date: Mar. 27, 2024

(87) PCT Pub. No.: WO2023/053783
    PCT Pub. Date: Apr. 6, 2023

(65)    Prior Publication Data
    US 2024/0397200 A1    Nov. 28, 2024

(30)    Foreign Application Priority Data

Oct. 1, 2021    (JP) ................................. 2021-162948

(51) Int. Cl.
    *H04N 23/60*        (2023.01)
    *G06V 40/16*        (2022.01)
    *H04N 23/611*       (2023.01)
(52) U.S. Cl.
    CPC ........... *H04N 23/64* (2023.01); *G06V 40/166* (2022.01); *G06V 40/171* (2022.01); *H04N 23/611* (2023.01)

(58) Field of Classification Search
    CPC .... H04N 23/64; H04N 23/611; G06V 40/171; G06V 40/166
    See application file for complete search history.

(56)    References Cited

U.S. PATENT DOCUMENTS 9,674,485 B1 *    6/2017    Sugaya ................ G06V 40/165
    2021/0224518 A1 *    7/2021    Choi ........................ G06T 7/593
    2024/0155244 A1 *    5/2024    Tsukada ................. H04N 23/73

FOREIGN PATENT DOCUMENTS

JP        2004-280277 A      10/2004
    JP        2006-268248 A      10/2006
    JP        2015005281 A  *    1/2015

OTHER PUBLICATIONS

International Search Report issued in International Bureau of WIPO Patent Application No. PCT/JP2022/031800, dated Nov. 8, 2022, along with an English translation thereof.

* cited by examiner

*Primary Examiner* — Rowina J Cattungal
(74) *Attorney, Agent, or Firm* — GREENBLUM & BERNSTEIN, P.L.C.

(57)    ABSTRACT

This imaging guidance device comprises: a storage unit that stores, for each facial part, a target condition of a property of a part image that is an image obtained by imaging the part; a part information acquiring unit that acquires part information related to a facial part to be analyzed of a subject; a part image extracting unit that extracts, from a facial image including the facial part to be analyzed, the part image of the facial part to be analyzed; and a subject guiding unit that guides an imaging state of the subject on the basis of the acquired part information, the extracted part image, and a target value of the property corresponding to the part information.

12 Claims, 9 Drawing Sheets

S101    Start

Acquire facial image

S102    Acquire part information, target luminance value, and the like

S103    Extract part image

S104    Specify luminance distribution, facial orientation, and the like

S105    Calculate facial orientation, direction of illumination, and the like

S106    Output guidance information

End

Start

S101 — Acquire facial image

S102 — Acquire part information, target luminance value, and the like

S103 — Extract part image

S104 — Specify luminance distribution, facial orientation, and the like

S105 — Calculate facial orientation, direction of illumination, and the like

S106 — Output guidance information

①

S101 — Acquire facial image

S102A — Read past imaging state and the like

S103 — Extract part image

S104 — Specify luminance distribution, facial orientation, and the like

S105 — Calculate facial orientation, direction of illumination, and the like

S106 — Output guidance information

IMAGING GUIDANCE DEVICE, IMAGING GUIDANCE METHOD, AND PROGRAM

TECHNICAL FIELD

The present disclosure relates to an imaging guidance apparatus, an imaging guidance method, and a program.

BACKGROUND ART

In recent years, as anon-contact method for biometric authentication, image-based face authentication using a captured facial image of a user or a part thereof has been introduced. In such face authentication, the user is guided to a predetermined position in order to acquire a captured facial image of the entire face of the user. For example, when an image of the user being imaged is displayed on a camera screen on a display, a face frame is superimposed on the camera screen, and the user is guided to move the face so as to fit in the face frame.

CITATION LIST

Patent Literature

PTL 1
Japanese Patent Application Laid-Open No. 2004-280277
PTL 2
Japanese Patent Application Laid-Open No. 2006-268248

SUMMARY OF INVENTION

In the face authentication as described above, it is desired that the entire face of the user is imaged with an illuminance equal to or greater than a predetermined illuminance. Meanwhile, a facial image captured by a camera has been used also in skin analysis. For example, a shop staff member of a cosmetics store operates a camera to image the skin of a customer, and the captured skin image is transmitted to a personal computer (PC) in the store and a server on a network, and skin analysis is performed. Alternatively, the customer himself/herself operates a smartphone to image his/her skin, and the captured skin image is transmitted to the server on the network, and the skin analysis is performed.

However, in the case where the skin analysis is performed, there are camera angles, illumination positions, and the like suitable for skin analysis, and it is difficult to determine whether a user who does not have expertise is successful at capturing a facial image suitable for the skin analysis. Especially in an online environment, it is difficult to acquire a facial image suitable for skin analysis because the staff member cannot directly move an image-capturing apparatus or correct the facial orientation of the user. Further, in the skin analysis, a required image changes depending on an object or a part for the analysis. It is thus difficult to present an easily and intuitively understandable indication for an amateur, such as "a sufficiently large and bright image of an entire face is satisfactory" for face authentication. For example, for analysis of the condition of wrinkles, the wrinkles may not be well imaged when illuminated by the illumination with light rays parallel along the wrinkles to be analyzed. Therefore, there is a problem that it is not possible to meet a demand to acquire a facial image suitable for skin analysis.

One non-limiting and exemplary embodiment of the present disclosure facilitates providing an imaging guidance apparatus, an imaging guidance method, and a program capable of guiding an imaging state of a user to acquire a facial image suitable for skin analysis.

An imaging guidance apparatus according to one exemplary embodiment of the present disclosure includes: a storage that stores, for each part of a face, a target condition of a characteristic of apart image being a captured image of the part; apart information acquirer that acquires part information related to an analysis-target part of a face of a subject; a part image extractor that extracts the part image of the analysis-target part of the face from a facial image including the analysis-target part of the face; and a subject guider that guides an imaging state of the subject based on the part information acquired, the part image extracted, and a target value of the characteristic corresponding to the part information.

An imaging guidance method according to one exemplary embodiment of the present disclosure is executed by a computer, the imaging guidance method including: storing, for each part of a face, a target condition of a characteristic of a part image being a captured image of the part; acquiring part information related to an analysis-target part of a face of a subject; extracting the part image of the analysis-target part of the face from a facial image including the analysis-target part of the face; and guiding an imaging state of the subject based on the part information acquired, the part image extracted, and a target value of the characteristic corresponding to the part information.

A program according to an embodiment of the present disclosure causes a computer to execute: storing, for each face part, a condition to be set as a target of a characteristic of a part image which is an image acquired by photographing the part; acquiring part information relating to a part of a face to be analyzed of the subject; extracting a part image of the analysis-target part of the face from a facial image including the analysis-target part of the face; and guiding an imaging state of the subject based on the acquired part information, the extracted part image, and a target value of the characteristic corresponding to the part information.

According to one exemplary embodiment of the present disclosure, it is possible to provide an imaging guidance apparatus, an imaging guidance method, and a program capable of guiding an imaging state of a user so as to acquire a facial image suitable for skin analysis.

3

Figure 6:
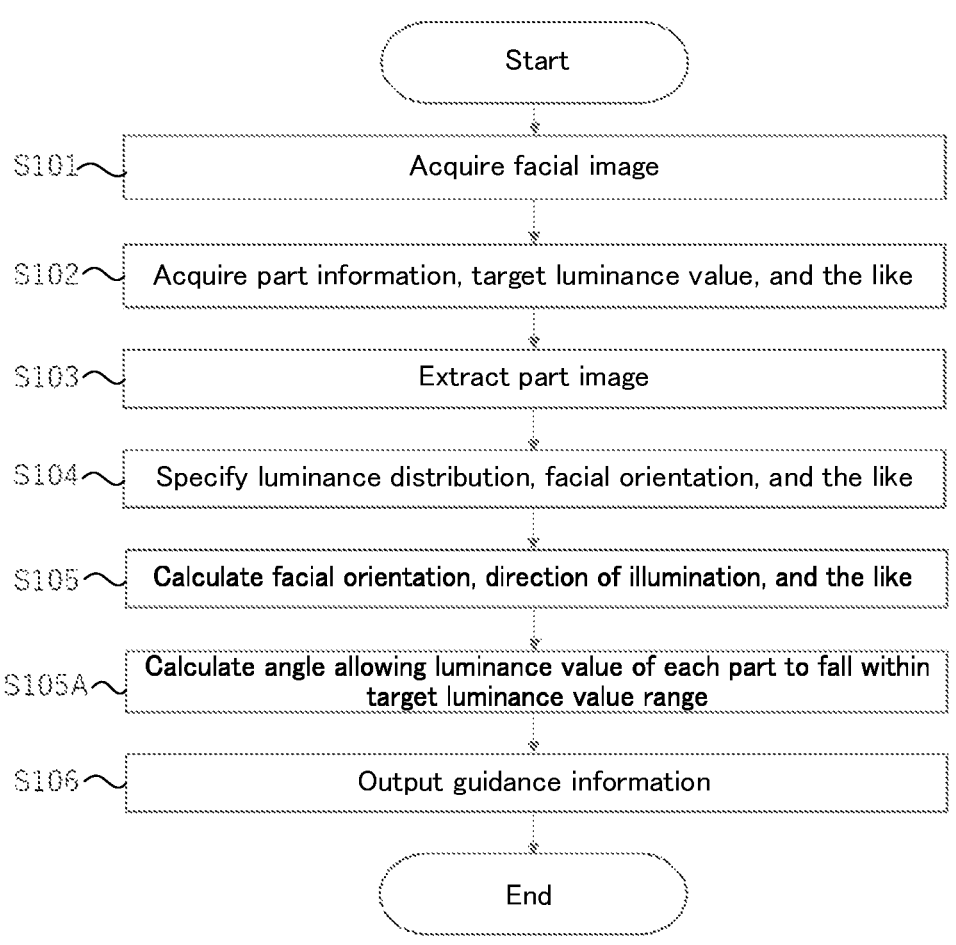
Figure 7:
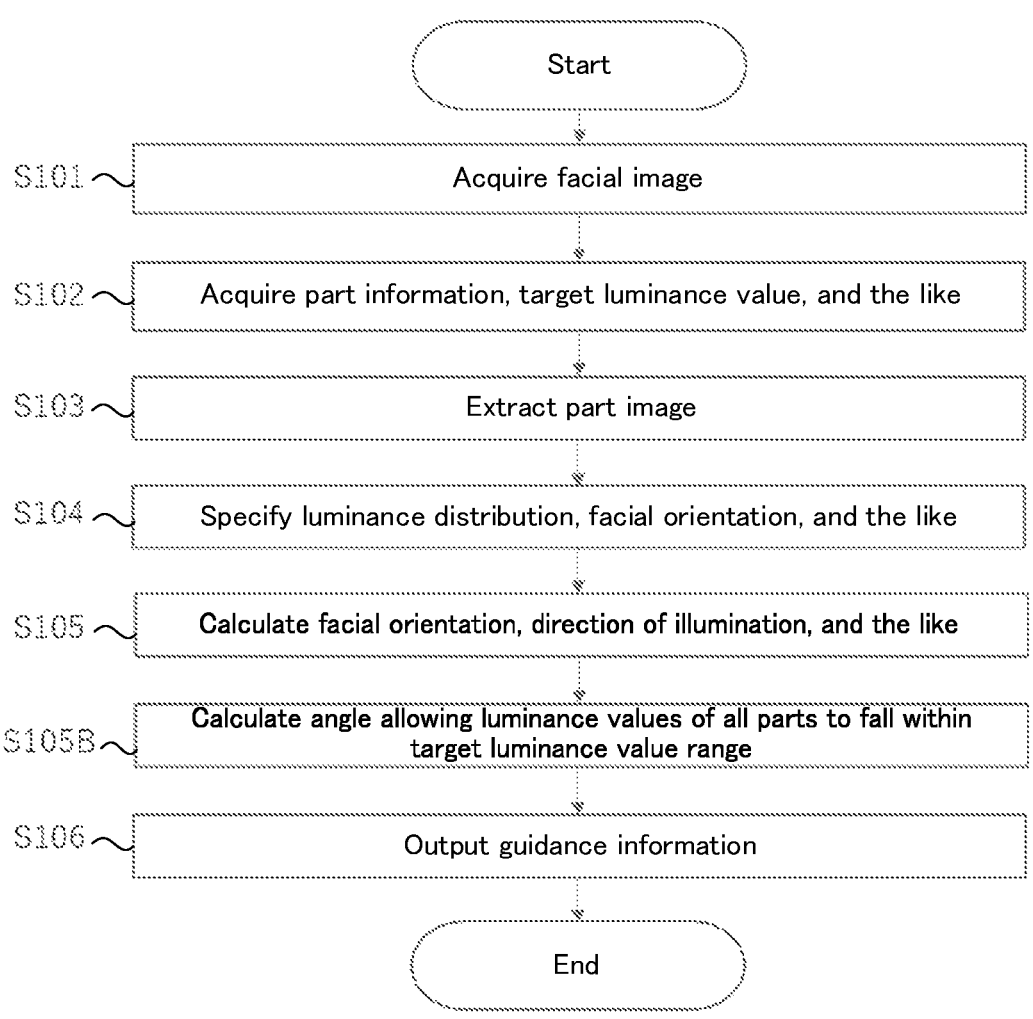
Figure 8A:
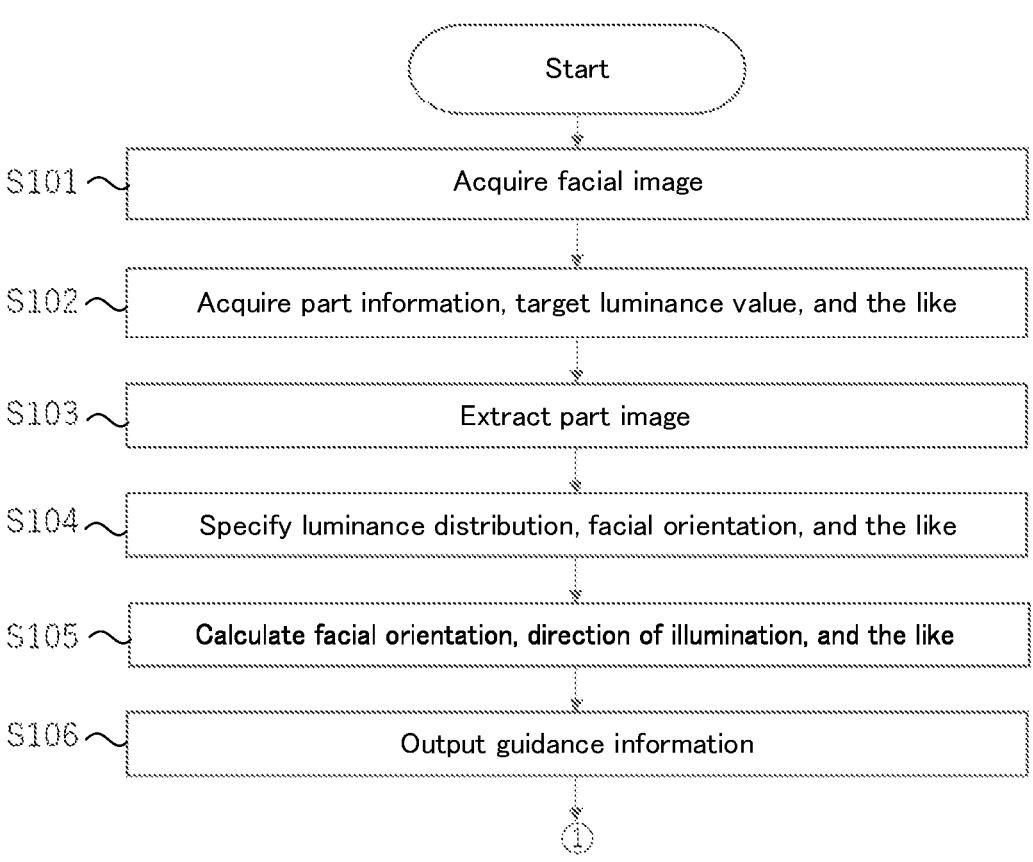
Figure 8B:
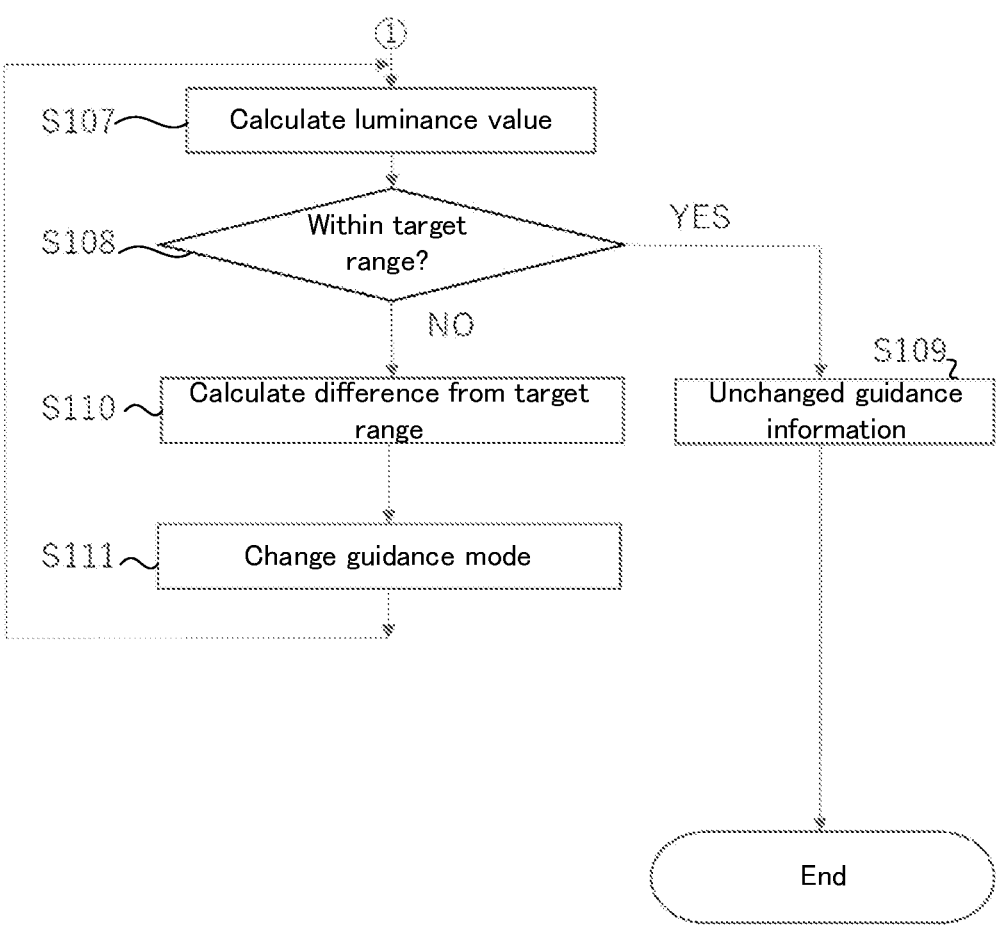
Figure 9:
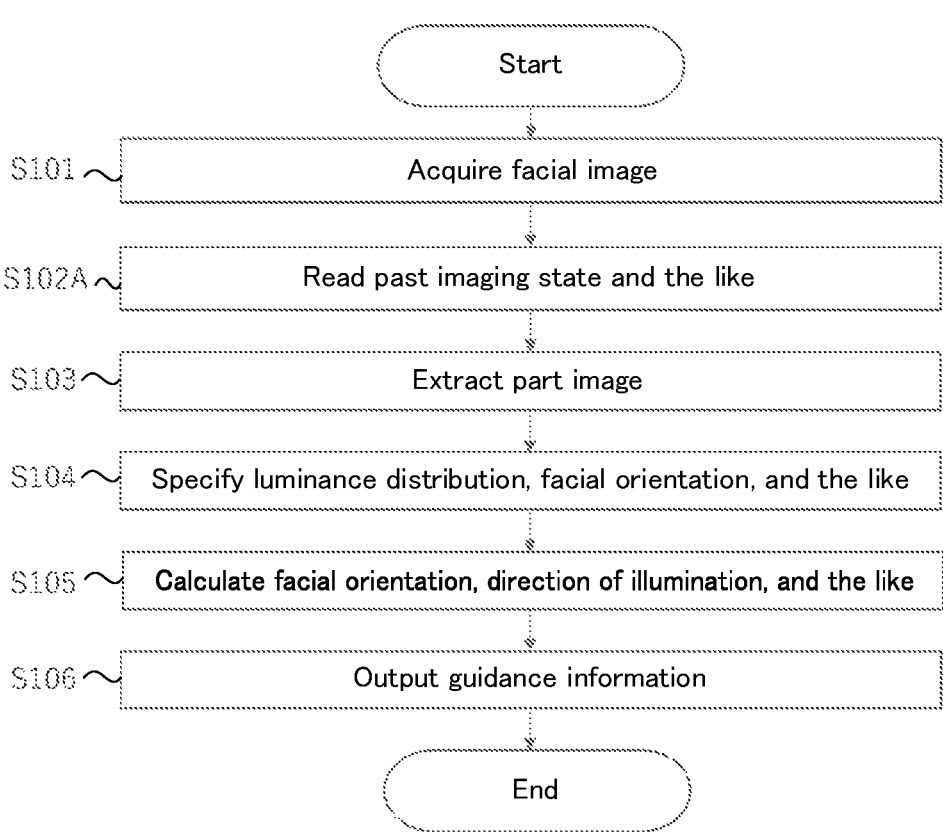

FIG. 6 is a flowchart illustrating an imaging state guidance process according to Variation 1 of the present disclosure;

FIG. 7 is a flowchart illustrating an imaging state guidance process according to Variation 2 of the present disclosure;

FIG. 8A is a flowchart illustrating an imaging state guidance process according to Variation 3 of the present disclosure FIG. 8B is a flowchart illustrating an imaging state guidance process according to Variation 3 of the present disclosure; and FIG. 9 is a flowchart illustrating an imaging state guidance process according to Variation 4 of the present disclosure.

DESCRIPTION OF EMBODIMENTS

Figure 1:
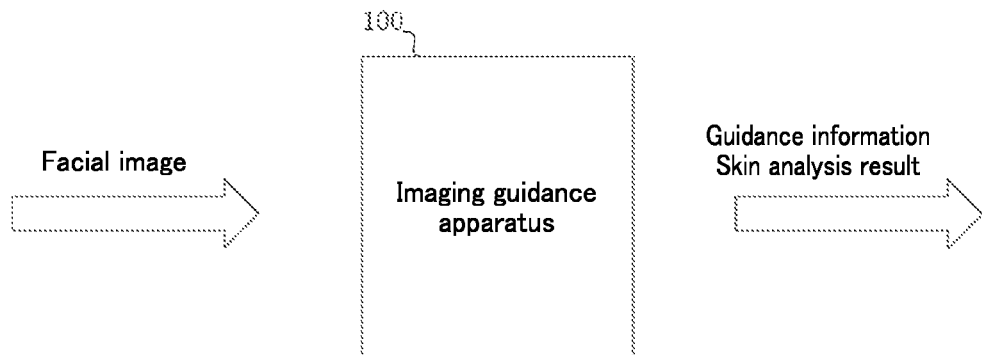
FIG. 1 is a schematic diagram of imaging guidance apparatus 100 according to an embodiment of the present disclosure.

Hereinafter, embodiments of the present disclosure will be described with reference to the drawings. FIG. 1 is a schematic diagram of imaging guidance apparatus 100 according to an embodiment of the present disclosure. As illustrated in FIG. 1, when a facial image of a user is acquired, imaging guidance apparatus 100 guides the user to an imaging position suitable for an analysis-target part of the face by voice guidance, text guidance, image guidance, or the like, and outputs a result of skin analysis on the user based on the facial image of the user at the imaging position. Imaging guidance apparatus 100 may be, for example, a terminal apparatus such as a personal computer or a tablet installed in a cosmetics store or the like, and may be used in a case where user's skin analysis is performed based on a facial image captured by a camera or the like. Alternatively, imaging guidance apparatus 100 may be a server installed on a network, and may be connected online to a terminal apparatus such as a smartphone or a camera owned by the user, and may perform the user's skin analysis based on a facial image received from the terminal apparatus.

Note that imaging guidance apparatus 100 is not limited to the above-described configuration, and may be any other information processing apparatus. Details of the configuration of imaging guidance apparatus 100 will be described later.

(Skin Analysis Procedure)

Figure 2A:
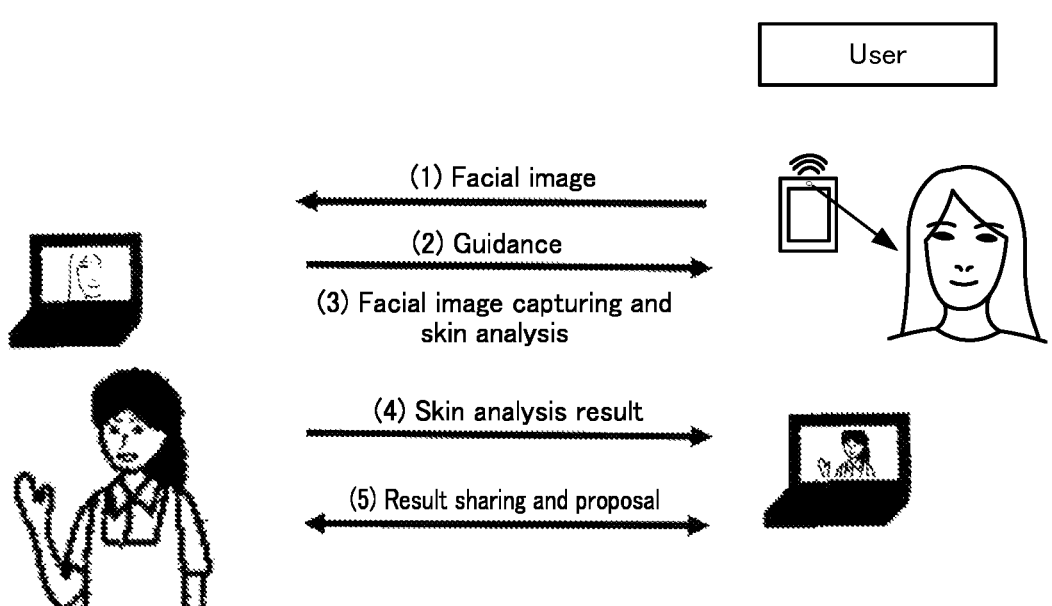
FIG. 2A illustrates a procedure of skin analysis by imaging guidance apparatus 100 according to an embodiment of the present disclosure.
Figure 2B:
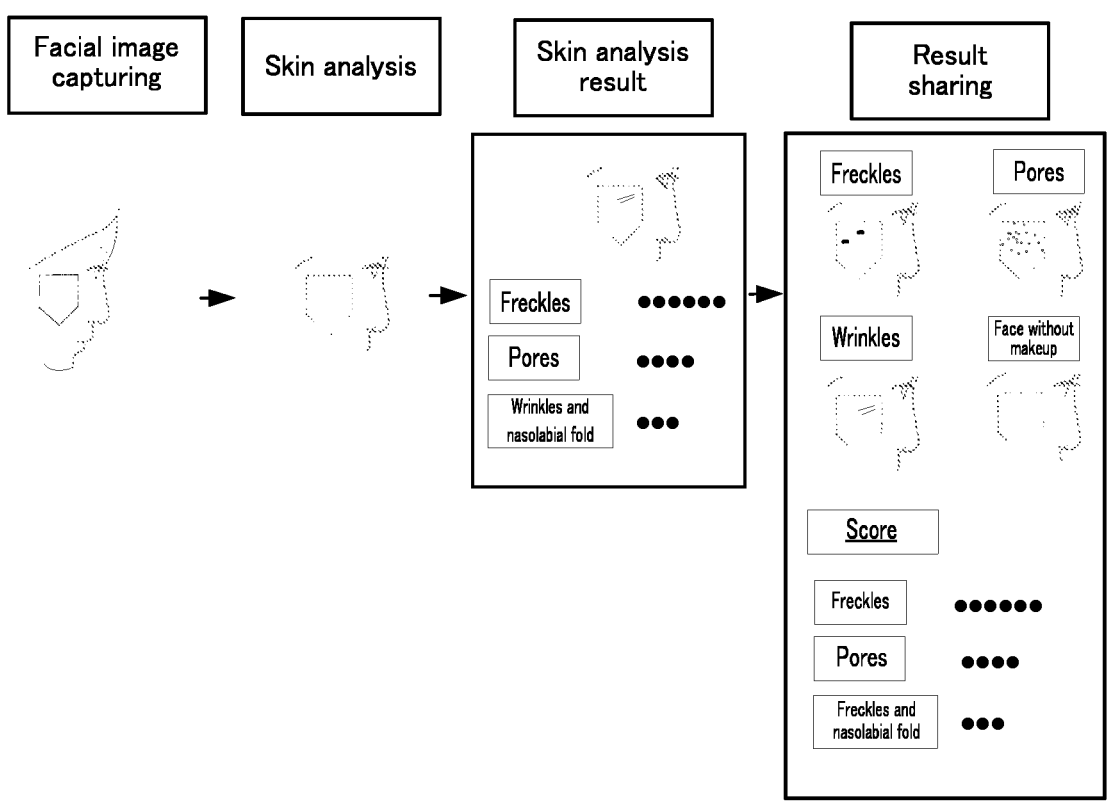
FIG. 2B illustrates the procedure of the skin analysis by imaging guidance apparatus 100 according to an embodiment of the present disclosure.

Hereinafter, a procedure for performing skin analysis will be described. FIGS. 2A and 2B illustrate a procedure of skin analysis performed by imaging guidance apparatus 100 according to an embodiment of the present disclosure.

(1) Imaging guidance apparatus 100 receives a facial image captured by a terminal apparatus of a user.

(2) Imaging guidance apparatus 100 generates guidance information for guiding the imaging state of the user based on the received facial image, and reproduces the guidance information on a display. A staff member operating imaging guidance apparatus 100 acquires a facial image suitable for skin analysis by instructing the user to change the facial orientation, adjust the luminance of the illumination, and the like while referring to the guidance information. Details of the guidance information will be described later.

(3) When the facial image suitable for skin analysis is displayed on the display of imaging guidance apparatus 100 after the user changes the facial orientation or the like in accordance with an instruction from the staff member operating imaging guidance apparatus 100, the facial image is captured as illustrated in FIG. 2B. Imaging guidance apparatus 100 starts the skin analysis based on the captured image of the right cheek. Note that the capturing of the facial image may be performed by remotely operating a facial image capturing apparatus (not illustrated) held by the staff member or the user, or by operating the facial image capturing apparatus by the user in accordance with an instruction from the staff member. In this case, imaging guidance apparatus 100 may notify the staff member of whether or not capture is to be performed, that is, whether or not the facial image suitable for skin analysis can be captured. In addition, imaging guidance apparatus 100 may be configured to instruct the facial image capturing apparatus to capture the facial image, when it is determined that the facial image suitable for skin analysis can be captured. In addition, the present guidance technique can not only be used for instructing the user from a staff member, but also applied to a case where the user alone operates the image capturing apparatus.

(4) Next, imaging guidance apparatus 100 analyzes the amount of wrinkles on the cheek, the amount of freckles, the length of a nasolabial fold, and the like by a known skin analysis method, stores a skin analysis result, and causes the terminal apparatus of the user to display the skin analysis result through an online conference tool or the like. The use of the online conference tool allows the staff member and user to share the skin analysis result in real time. In addition to sharing the skin analysis result by using the online conference tool or the like, imaging guidance apparatus 100 may transmit skin analysis result data to the terminal apparatus of the user so that the user can confirm the skin analysis result at any timing. As illustrated in FIG. 2B, an image acquired by superimposing the image of wrinkles on the image of the right cheek, an image of a barometer representing a degree of freckles, and the like may be included in the skin analysis result.

(5) The terminal apparatus receiving the skin analysis result information provides the skin analysis result to the user. Thus, the staff member operating imaging guidance apparatus 100 and the user can share the skin analysis result. The staff member operating imaging guidance apparatus 100 can propose an optimal cosmetic, care goods, and the like according to the skin analysis result to the user.

(Facial Image Suitable for Skin Analysis)

The following images may be included as the facial image suitable for skin analysis.

(1) If the skin image is too bright due to sebum or the like locally illuminated with light, the state of wrinkles, pores, or the like may not be appropriately analyzable. Therefore, a facial image in which the part subjected to the skin analysis is not too bright may be an image suitable for the skin analysis. In addition, even when the cheek is shining, a facial image in which a target part for the skin analysis is a part other than the cheek and this target part is not shining can be an image usable for the skin analysis.

(2) A facial image captured in a dark place or a facial image in which a shadow of a terminal apparatus appears may result in inaccurate analysis of states of wrinkles, pores, freckles, or the like due to low illuminance. For this reason, a facial image without any dark region within the part subjected to the skin analysis can be an image suitable for the skin analysis. In this case, the other parts may be dark as long as the sufficient brightness of the part subjected to the skin analysis is secured.

(3) A facial image captured by using illumination equipment that emits light such that the entire face is uniformly exposed to light is suitable for face authentication or the like, but freckles, wrinkles, and the like disappear due to omnidirectional light. Therefore, a facial image not of a face entirely illuminated with uniform light, but of a face illuminated, at the target part for the skin analysis, with light of a predetermined level of luminance in a certain direction may be an image suitable for skin analysis. Even if the entire face is not uniformly bright, a facial image of a face illuminated, at the target part for the skin analysis, with light of a predetermined level of luminance and illuminated, at the other parts, with light of a luminance lower or higher than the predetermined level may be an image suitable for skin analysis. That is, as long as the light illuminating the target part for the skin analysis is appropriate, the state of the light illuminating the other parts does not matter. Specifically, for example, even when the parts other than the analysis-target part are dark or even when freckles or wrinkles on the other parts than the analysis-target part are made invisible, such an image is suitable for use in skin analysis of the target part.

Note that the images suitable for skin analysis illustrated above are examples, and whether or not a facial image is the image suitable for skin analysis may vary depending on a target part and an analysis content. For example, when the skin analysis is performed on the amount of skin sebum based on reflection of light on sebum or the like, a facial image in which the part subjected to the skin analysis shines can be an image suitable for skin analysis in contrast to the above-described examples. Therefore, in the case of configuring imaging guidance apparatus 100 capable of supporting a plurality of skin analysis purposes, imaging guidance apparatus 100 stores a target part for each skin analysis purpose and the characteristics of the facial image suitable for the skin analysis, reads this information depending on the skin analysis purpose designated by the staff member or the user, and determines whether or not an image is suitable for the skin analysis.

In order to acquire a facial image suitable for skin analysis as described, it is effective to guide the imaging state of the user so as to adjust the position of the camera, the facial orientation, the position of the illumination, the brightness of the illumination, and the like.

Figure 3:
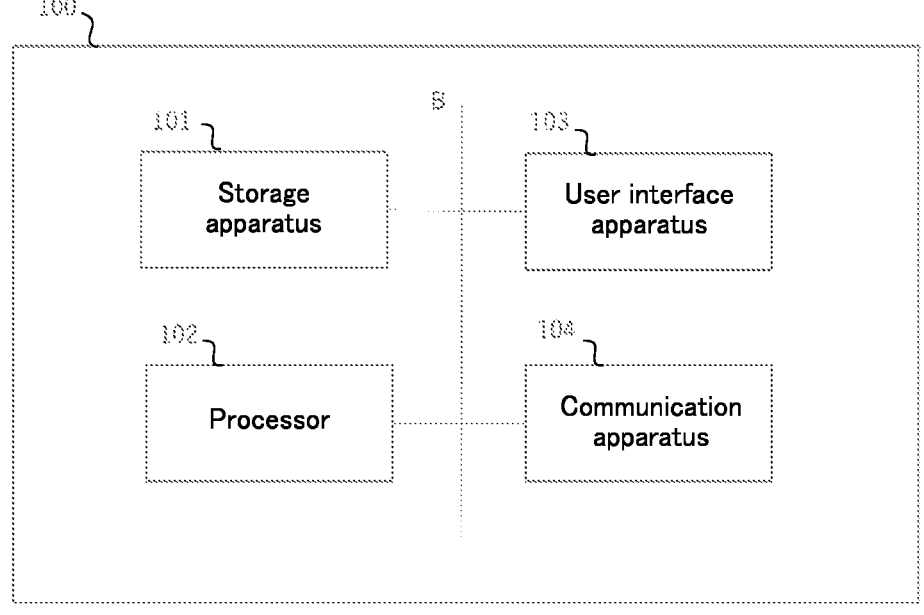
FIG. 3 is a block diagram illustrating a hardware configuration of imaging guidance apparatus 100 according to an embodiment of the present disclosure.

Next, an exemplary hardware configuration of imaging guidance apparatus 100 will be described with reference to FIG. 3. FIG. 3 is a block diagram illustrating the hardware configuration of imaging guidance apparatus 100 according to the embodiment of the present disclosure.

Imaging guidance apparatus 100 is realized by a computing apparatus such as a smartphone, a tablet, or a personal computer, and may have, for example, the hardware configuration as illustrated in FIG. 3. That is, imaging guidance apparatus 100 includes storage apparatus 101, processor 102, user interface apparatus 103, and communication apparatus 104 that are interconnected to one another via bus B.

Programs or instructions for implementing various functions and processes described later in imaging guidance apparatus 100 may be downloaded from any external apparatus via a network or the like, or may be provided from a removable storage medium such as a Compact Disk-Read Only Memory (CD-ROM) or a flash memory.

Storage apparatus 101 is realized by a random access memory, a flash memory, a hard disk drive, and the like, and stores, together with an installed program or instruction, a file, data, or the like used for executing the programs or instructions. Storage apparatus 101 may include a non-transitory storage medium.

Processor 102 may be implemented by one or more Central Processing Units (CPUs), Graphics Processing Units (GPUs), processing circuitry, and the like, which may be composed of one or more processor cores. Processor 102 performs various functions and processes of imaging guidance apparatus 100 described later, in accordance with data or the like such as programs, instructions, parameters required to execute the programs or instructions stored in storage apparatus 101.

User interface apparatus 103 may include: an input apparatus such as a keyboard, a mouse, a camera, and a microphone; an output apparatus such as a display, a speaker, a headset, and a printer; and an input/output apparatus such as a touch panel, and realizes an interface between the user and imaging guidance apparatus 100. For example, the user operates imaging guidance apparatus 100 by operating a Graphical User Interface (GUI) displayed on the display or touch panel.

Communication apparatus 104 is realized by various communication circuitry that executes a communication process with a communication network such as an external apparatus, the Internet, and a Local Area Network (LAN).

However, the above-described hardware configuration is merely an example, and imaging guidance apparatus 100 according to the present disclosure may be realized by any other suitable hardware configuration. For example, the functions of imaging guidance apparatus 100 may be distributed between and realized by a plurality of computers. In this case, information exchange between the functions of the different computers is performed via a communication network (such as LAN or the Internet) that connects between the computers.

Figure 4:
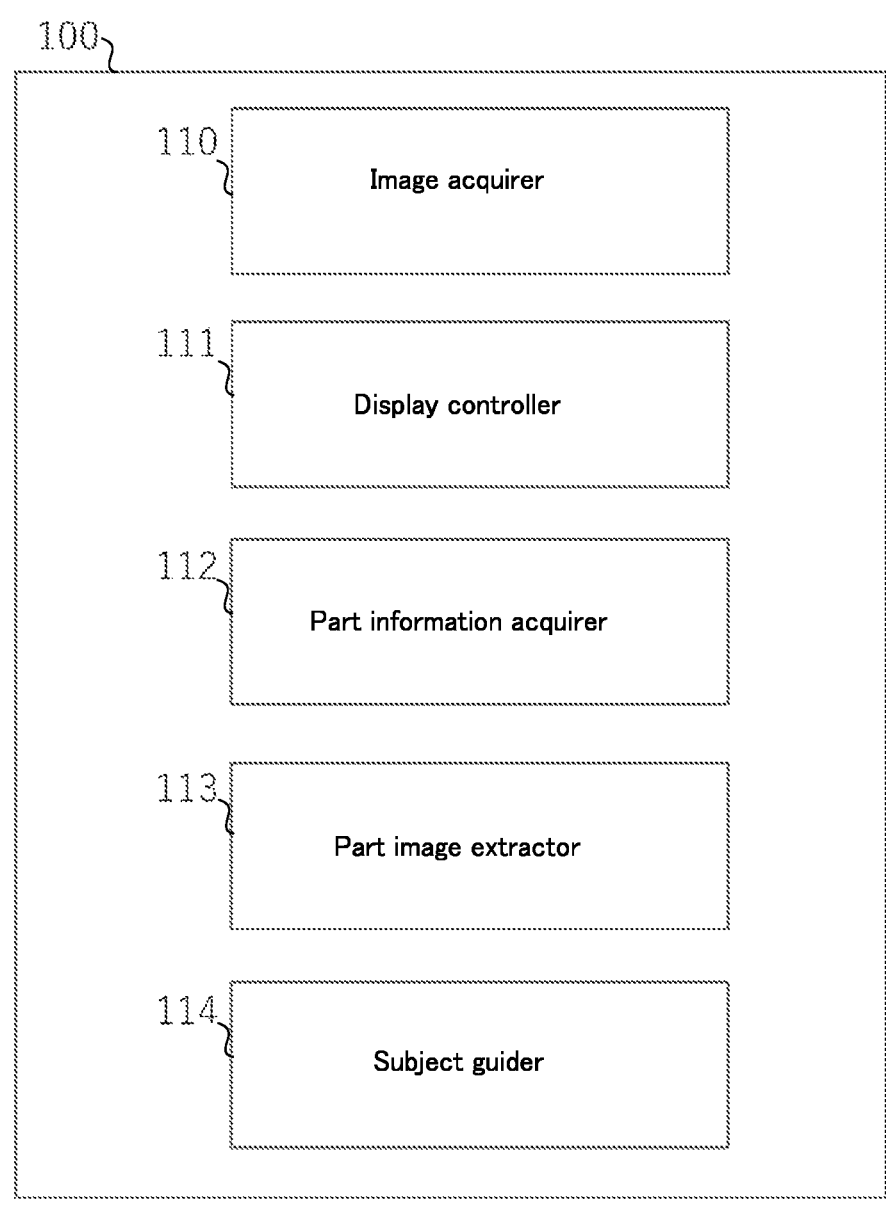
FIG. 4 is a block diagram illustrating a functional configuration of imaging guidance apparatus 100 according to an embodiment of the present disclosure.

FIG. 4 is a block diagram illustrating a functional configuration of imaging guidance apparatus 100 according to the embodiment of the present disclosure. Imaging guidance apparatus 100 includes image acquirer 110, display controller 111, part information acquirer 112, part image extractor 113, and subject guider 114.

(Image Acquirer 110)

Image acquirer 110 acquires a captured facial image of a facial expression of the user. Specifically, the camera captures an image of the face of the user, and image acquirer 110 acquires the image of the face of the user acquired by the camera. The camera captures an image of a measurement target region and generates an RGB image of the measurement target region. For example, the camera may be a monocular camera and generates a monocular RGB image. An image may be acquired not by the camera but by capturing a video received via a network.

(Display Controller 111)

Display controller 111 displays the facial image on the display of imaging guidance apparatus 100. When a target part for the skin analysis is selected in the displayed facial image, the part information on the selected part of the face is transmitted to part information acquirer 112 and part image extractor 113. The target part for the skin analysis is selected by, for example, a touch operation on the screen of the terminal apparatus of the user, a mouse operation of a mouse connected to imaging guidance apparatus 100, or the like.

(Part Information Acquirer 112)

Part information acquirer 112 acquires part information (for example, information indicating the position of the cheek) on the selected part of the face (the target part for the skin analysis) based on facial feature points of the facial parts such as the cheek, the *glabella*, and the forehead. Further, part information acquirer 112 acquires, from the server or the like, a target luminance value or the like of the selected part of the face. For example, the part information may include the position of the part in the face and the target luminance value for each analysis-target part of the face.

(Part Image Extractor 113)

Part image extractor 113 analyzes the facial feature points from the facial image including the analysis-target facial part, and extracts the part image (an image of freckles, wrinkles, pores, or the like) of the analysis-target facial part based on the position of the part (for example, a region defined by one or more facial feature points that specify the position) in the part information. Part image extractor 113 transmits the extracted part image to subject guider 114.

(Subject Guider 114)

Subject guider 114 acquires the part information and the part image, and generates guidance information based on the part information and the part image. Specifically, subject guider 114 specifies a luminance distribution (degrees of light and darkness) of the part image extracted by part image extractor 113. For example, a region with a high luminance may be considered close to the illumination and a region with a low luminance may be considered remote from the illumination. Thus, it is possible to specify in which direction the face is illuminated with the light. Further, subject guider 114 calculates the facial orientation of the user based on the positional relation of the facial feature points acquired from the facial image using a well-known facial orientation estimation technique. It is thus possible to determine whether the face faces straight toward the camera (the face looks straight at the camera) or the face faces obliquely toward the camera.

As described above, after specifying the direction of the illumination, the facial orientation of the user, and the like, subject guider 114 calculates a facial orientation of the user and a direction of the illumination allowing the luminance value of the target part for the skin analysis acquired by part information acquirer 112 to fall within the range of the target luminance value described above. Based on the calculated facial orientation and the direction of the illumination, subject guider 114 generates guidance information for guiding the imaging state of the user. For example, when the luminance value at the target part is lower than the lower limit of the target luminance value, subject guider 114 may guide the user to bring the face closer in a direction to alight source of the illumination. Alternatively, when the upper limit of the luminance value at the target part is exceeded, subject guider 114 may guide the user away from the direction of the light source of the illumination.

(Guidance Information)

The guidance information is information for guiding the imaging state (a position of a camera, a facial orientation, a position of illumination, and the like) of the user so as to acquire an image suitable for skin analysis. The guidance information may include the following information.

(1) Guidance to guide the user to direct the user's face in a predetermined direction.

(2) Guidance to guide the user to direct the orientation of the terminal apparatus in a predetermined direction.

(3) Guidance to prompt the user to adjust the distance from the user's terminal apparatus to the user's face.

(4) Guidance to prompt the user to adjust the orientation, brightness, and/or the like of the illumination illuminating the user's face.

Exemplary instructions of the guidance include "slowly move the smartphone to the right," "keep the smartphone at the present position," "turn your face to the left," "keep your face at the present position," and "slightly dim the illumination." Here, various modes of guidance output are conceivable. For example, the guidance content may be presented to the terminal used by the staff member in text, as an image, or the like, and the staff member may instruct the user to read the guidance content aloud. Such a configuration is useful, for example, in a case where a screen on which guidance information can be visually recognized is unavailable at the user's end, such as in a case where the user captures a facial image using a rear camera of the smartphone. The guidance information may also be provided to the image-capturing apparatus (smartphone or the like) owned by the user. Such a configuration is useful when a screen that can be visually recognized is available at the user's end, for example, when the user captures a facial image using a front camera of a smartphone or the like. The guidance may be provided as an image. For example, in a case where a screen on which guidance information can be visually recognized is available at the user's end, it is conceivable to display, by an arrow or the like, a direction in which a face or an image-capturing apparatus (such as a smartphone) should be moved, or to display a guide of a face frame or the like when a current facial image of the user himself/herself can be visually recognized by the user.

Figure 5:
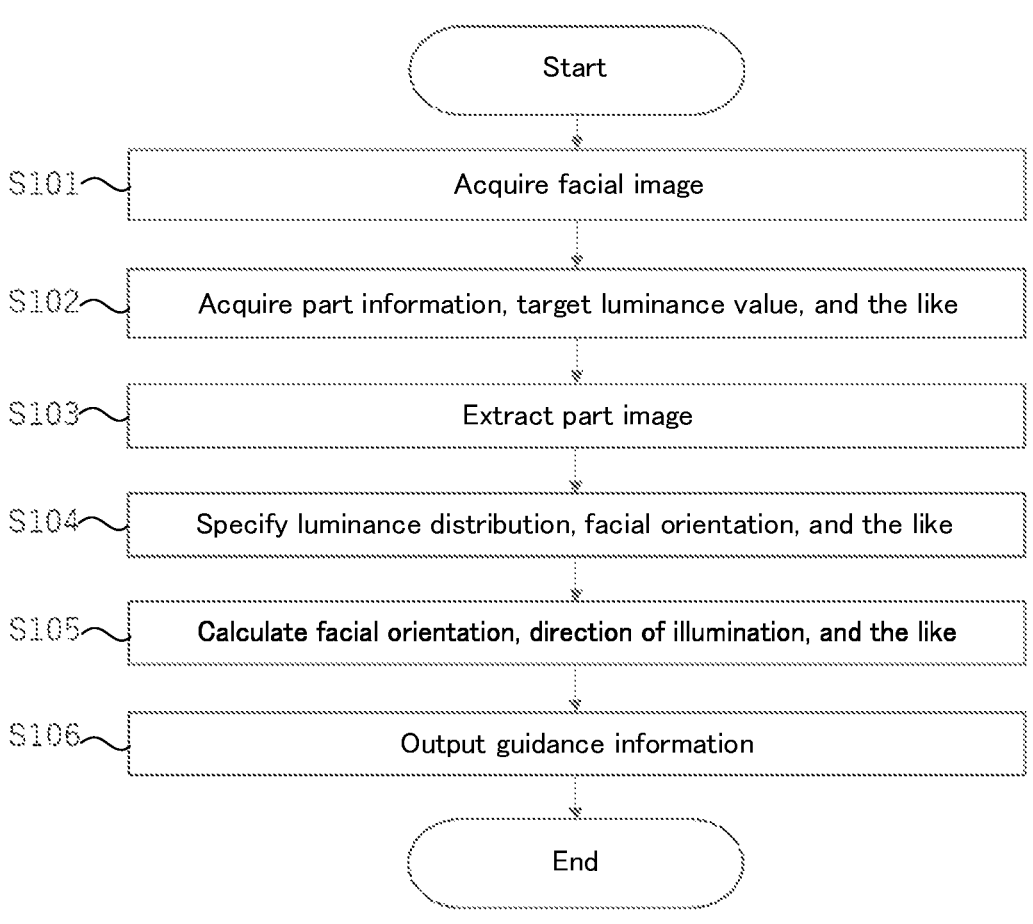
FIG. 5 is a flowchart illustrating an imaging state guidance process according to an embodiment of the present disclosure.

Referring now to FIG. 5, an imaging state guidance process according to one exemplary embodiment of the present disclosure will be described. The imaging state guidance process may be performed by above-described imaging guidance apparatus 100, and more specifically, one or more processors 102 of imaging guidance apparatus 100 may execute one or more programs or instructions stored in one or more storage apparatuses 101. For example, the facial type diagnosis process can be started when the user of imaging guidance apparatus 100 activates an application or the like related to the process.

FIG. 5 is a flowchart illustrating the imaging state guidance process according to an embodiment of the present disclosure. As illustrated in FIG. 5, in step S101, imaging guidance apparatus 100 acquires a facial image. Specifically, the camera captures an image of the face of the user, and imaging guidance apparatus 100 acquires the image of the face of the user captured by the camera.

Next, in step S102, imaging guidance apparatus 100 acquires the part information (for example, information indicating the position of the cheek) related to the part for skin analysis selected in the facial image. For example, the part information may include a position of the part and a target luminance value for each analysis-target part of the face.

Next, in step S103, imaging guidance apparatus 100 analyzes the facial feature point from the facial image including the analysis-target part of the face, and extracts the part image (an image of freckles, wrinkles, pores, or the like) of the analysis-target part of the face based on the facial feature point based on the position of the part in the part information.

Next, in step S104, imaging guidance apparatus 100 specifies, based on the part information and the part image, the luminance distribution of the analysis-target part, the orientation of the user's face, and the like.

Next, in step S105, imaging guidance apparatus 100 calculates the orientation of the user's face, the direction of illumination, and the like allowing the luminance value of the target part for the skin analysis to fall within the range of the target luminance value.

Finally, in step S106, subject guider 114 generates and outputs the guidance information for guiding the imaging state of the user based on the calculated facial orientation and the direction of illumination.

Note that a skin analysis process of imaging guidance apparatus 100 may include the following modes.

Variation 1

There are suitable ways of illuminating wrinkles on the face with light depending on the parts. For example, wrinkles on the forehead are often formed by streaks extending in the lateral direction, and therefore, the wrinkles on the forehead can be accurately analyzed by illuminating the wrinkles in a direction from above or below the face. Meanwhile, wrinkles between the eyebrows are often formed by streaks extending in the vertical direction, and therefore, the wrinkles on the forehead can be accurately analyzed by illuminating the wrinkles in the left or right direction of the face. Therefore, in the present variation, the part information further includes a target direction of illumination for each part of the face. Subject guider 114 may be configured to guide the imaging state of the user such that, depending on the analysis-target part of the face, the luminance value indicating the luminance of the facial part falls within the target range, and the direction of illumination is within the range of the target direction.

FIG. 6 is a flowchart illustrating an imaging state guidance process according to Variation 1 of the present disclosure. The difference from FIG. 5 is that processing of step S105A is added in FIG. 6. Hereinafter, description of the same processing as the processing of each step illustrated in FIG. 5 will be omitted, and different processing will be described.

In step S105A, subject guider 114 refers to a table in which target parts for skin analyses and facial orientations are associated with each other, and reads information on the orientation of the face corresponding to the target part for the skin analysis acquired by part information acquirer 112. Then, the user is guided so that the luminance value at the target part for the skin analysis falls within the range of the target luminance value and the illumination direction falls within the range of the target direction. Alternatively, subject guider 114 may change the illuminated position in the face, the position of the mobile terminal capturing the image of the user, and the like.

As described above, after calculating the angle and the like of the face of the user, subject guider 114 generates and outputs the guidance information in step S106 depending on the target part for the skin analysis such that the luminance value indicating the luminance of the target part falls within the target range and the illumination direction falls within the range of the target direction.

For example, subject guider 114 generates, as the guidance information, guidance such as "tilt your face downward by 45°" in the case of analysis of wrinkles on the forehead, or guidance such as "turn your face leftward by 45°" in the case of analysis of wrinkles between the eyebrows. As described above, by guiding the imaging state of the user depending on each target part for the skin analysis, it is possible to adjust the illumination suitable for the analysis-target part, and thus to achieve accurate analysis of the analyzed part.

Variation 2

In Variation 1, the imaging state of the user is changed depending on the analysis-target part of the face. In addition, for example, when the wrinkles on the forehead and the wrinkles between the eyebrows are analyzed at the same time, it is effective to guide the face of the user so as to move the face in the vertical and horizontal directions so that the luminance values at respective parts fall within the range of the target luminance values. Therefore, subject guider 114 may be configured to guide the imaging state of the user so that a plurality of analysis-target parts (for example, the entire face) fall within a range of predetermined conditions.

FIG. 7 is a flowchart illustrating an imaging state guidance process according to Variation 2 of the present disclosure. A difference in the flowchart from FIG. 6 is that processing of step S105B is added instead of the processing of step S105A. Hereinafter, description of the same processing as the processing of each step illustrated in FIG. 5 will be omitted, and different processing will be described.

In step S105B, subject guider 114 refers to the part information on each analysis-target part, and reads the information on the position, the target luminance value, and the target direction corresponding to each of the target parts. Then, the user is guided so that all the luminance values of the target parts of the skin analysis fall within the ranges of the target luminance values and the illumination direction falls within the range of the target direction. For example, subject guider 114 may guide the user to change the illuminated position in the face, the position of the mobile terminal capturing the image of the user, and the like.

As described above, after calculating the angle and the like of the face of the user, subject guider 114 generates and outputs the guidance information such that all the luminance values of the target parts of the skin analysis fall within the target range and the illumination direction falls within the range of the target direction in step S106.

In general, it is more difficult to bring all the luminance values of a plurality of parts within the target ranges than bringing the luminance value of a single part within the target range. Therefore, the target range of each part in the present variation may be wider than the target range in the case where only a single part is to be analyzed.

For example, subject guider 114 generates, as the guidance information, guidance such as "slowly turn your face to the left while tilting your face slightly downward" in the case of analysis of wrinkles on the forehead and between the eyebrows at the same time. As described above, by guiding the imaging state of the user so that all the luminance values of the target parts for the skin analysis fall within the ranges of the target luminance values and the illumination direction falls within the range of the target direction, it is possible to perform the skin analysis on a plurality of parts in a shorter time as compared with the case where the imaging state of the user is changed for each part to be analyzed.

Variation 3

Even when the user's imaging state is guided by a single certain guidance method, only a single guidance may be insufficient for obtaining a suitable image. In this case, it is preferable to change the guidance mode. Accordingly, subject guider 114 may be configured to compare the user's imaging states before and after guidance, and change the method of guidance of the imaging state of the user depending on a comparison result.

FIGS. 8A and 8B are flowcharts illustrating an imaging state guidance process according to Variation 3 of the present disclosure. A difference in the flowcharts from FIG. is that processing of steps on and after step S107 is added. Hereinafter, description of the same processing as the processing of each step illustrated in FIG. 5 will be omitted, and different processing will be described.

For example, when the wrinkles on the forehead are analyzed, subject guider 114 calculates a change in luminance value of the forehead in step S107 after outputting the guidance information.

When the luminance value is changed so as to approach the target range ("YES" at step S108), the orientation of the user's face, the direction of light from the illumination onto the face, and the like are appropriate. Accordingly, the guidance information is continuously outputted without any change in the content of the guidance information (step S109).

When the luminance value of the forehead changes so as not to approach the target range ("NO" in step S108), the orientation of the user's face, the direction of light from the illumination onto the face, and the like are inappropriate. Accordingly, in step S110, subject guider 114 calculates a change amount of a difference between the luminance value of the forehead and the target range.

In step S111, after calculating the difference, subject guider 114 changes the guidance method in accordance with the calculated change amount of the difference. For example, a guidance phrase may be prepared in advance in a table or the like, and subject guider 114 may guide the user using a different guidance phrase according to the change amount of the difference. Alternatively, the guidance information in the text format may be changed to the guidance information in the image format or the audio format.

A series of processes are executed until the luminance value of the forehead falls within the target range. Thus, even when a facial image suitable for skin analysis cannot be acquired by only a single guidance, changing the guidance mode makes it possible to display the facial image suitable for skin analysis in a short time.

Note that changing the guidance information in the present variation may be a process of dividing the target guidance content. For example, in a case where the guidance content is intended to cause the user to face obliquely upward to the right and when the luminance value does not approach the target range, the guidance may be performed in two divided steps of "turn your face to the right" and "turn your face upward." Further, changing the guidance information in the present variation may be a process of switching a guidance content equivalent to the target guidance content to another expression. For example, in a case where the luminance value does not approach the target range despite the guidance of "turn your face to the right" is performed, it is conceivable to change the expression to "move the image-capturing apparatus to the left" or the like. It should be noted that the guidance content before or after the change may be appropriately replaced with the divided guidance contents or an object to be moved or turned may also be appropriately replaced.

Further, determination of whether or not the luminance value is changed so as to approach the target range may be made within a certain set time limit. When the luminance value is not improved immediately after the guidance, it is conceivable that the guidance content itself has been accurately understood but just the user has not performed the operation yet. Thus, changing the guidance content only because the luminance value is not close to the target range may instead confuse the user. On the other hand, when the luminance value is not close to the target range for a long time, it is highly likely that the user does not accurately understand the guidance content. Therefore, it is highly likely that the situation is improved by switching the guidance content.

Further, changing the guidance information in the present variation may be controlled such that, even when the luminance value is away from the target range, the guidance content is not changed as long as a change is within a predetermined range. This is because the luminance value of the face may temporarily change in a direction away from the target range due to the surrounding environment, camera shake, or the like even when the user tries to move as instructed.

Variation 4

When the skin analysis is performed, it is preferable that, when the imaging state of the user is newly guided, the imaging state of the user be guided such that the imaging state (the facial orientation, the way of illuminating the face, the distribution of the luminance value, the standard deviation of the luminance value, and the like) is equal to the imaging state at the time of the skin analysis performed in the past.

Therefore, subject guider 114 may be configured to store, in chronological order, the past imaging state of the user guided, and to guide the imaging state of a subject such that the imaging state is equal to the stored past imaging state, when the imaging state is newly guided.

FIG. 9 is a flowchart illustrating an imaging state guidance process according to Variation 4 of the present disclosure. The difference from FIG. 5 is that processing of step S102A is added in place of the processing of step S102 in FIG. 9. Hereinafter, description of the same processing as the processing of each step illustrated in FIG. 5 will be omitted, and different processing will be described.

In step S102A, part information acquirer 112 acquires the part information on the part for the skin analysis selected in the facial image, and reads the part information (which may include the position of the analysis-target part of the face, the target luminance value, the target standard deviation, and/or the like) for the stored past imaging state. Then, in step S106, subject guider 114 guides the imaging state of the subject such that the imaging state is equal to the imaging state read in step S102A, when the imaging state is newly guided.

Thus, it is possible to conduct the skin analysis in an environment close to imaging conditions at the time of the past skin analysis. It is thus possible for the staff member operating imaging guidance apparatus 100 to recognize changes in skin in time series regarding how much the state of the analyzed part improved as compared to the past skin analysis result. Accordingly, optimal cosmetics, care goods, and the like can be proposed to the user depending on the analysis result.

As described above, the imaging guidance apparatus according to the embodiment of the present disclosure includes: a storage that stores, for each part of a face, a target condition of a characteristic of a part image being a captured image of the part; a part information acquirer that acquires part information related to an analysis-target part of a face of a subject; a part image extractor that extracts the part image of the analysis-target part of the face from a facial image including the analysis-target part of the face; and a subject guider that guides an imaging state of the subject based on the part information acquired, the part image extracted, and a target value of the characteristic corresponding to the part information.

With this configuration, even when the user who does not have expertise captures the facial image by himself/herself, it is possible to guide the directions of the face, the image-capturing apparatus, and the like such that an image suitable for skin analysis is captured. Thus, even in a case where the user himself/herself captures the facial image for skin analysis in an online environment or the like, it is possible to acquire a facial image allowing skin diagnosis with the same accuracy as in a case where a specialist staff member captures the facial image for skin analysis.

The above-described embodiment has been described in relation to the online environment as an example, but when it is difficult for the staff member to directly move the image-capturing apparatus or the user's face, the imaging guidance apparatus according to the present embodiment can be utilized to acquire the same effects.

Other Variations

In the above-described embodiment, the characteristics related to luminance are mainly used for evaluation of whether or not the facial image is suitable for skin analysis. However, whether or not the facial image is suitable for skin analysis may also be evaluated based on other characteristics such as the size of the analysis-target part and the position of the analysis-target part in the facial image. That is, in the above-described embodiment and variations, desired values of the other characteristics instead of the luminance may be stored in association with each part, and guidance may be performed so that the characteristics approach desired values depending on the analysis-target part.

In the above-described embodiment, the guidance of the movement or turn of the face and the guidance of the movement or the turn of the image-capturing apparatus (such as a smartphone) may be interchanged with each other. This is because the movement or turn of the image-capturing apparatus in one direction and the movement or turn of the face in the opposite direction appear as the same change in the facial image. Further, using this characteristics, which of the image-capturing apparatus and the face of the user is set as the object to be moved or turned is switched in Variation 2 at the time of changing the guidance content. This switching is particularly advantageous in cases where the movement or turn of either the face or the image-capturing apparatus is restricted, such as in a case where the facial orientation of the user is already moved or turned to the limit of the range of motion of the human body, and in a case where the image-capturing apparatus is stationary. However, in a case where illumination is performed in a biased direction, appearances of shadows are different between the movement or turn of the image-capturing apparatus and the movement or turn of the face. It is thus inappropriate to replace the object to be moved or turned. Thus, in a case where the result of the analysis of the facial image indicates that the illumination is performed in the biased direction, switching to the guidance content in which the object to be moved or turned is replaced may be suppressed also in Variation 2. Similarly, in the case of guiding the luminance and/or the way of illumination, the same result can be acquired by moving any of the face, the image-capturing apparatus, and the illumination. Therefore, a subject to be guided may be switched as necessary.

Note that, for example, the following aspects are also understood to fall within the technical scope of the present disclosure:

(1) An imaging guidance apparatus according to an embodiment of the present disclosure includes: a storage that stores, for each part of a face, a target condition of a characteristic of a part image being a captured image of the part; a part information acquirer that acquires part information related to an analysis-target part of a face of a subject; a part image extractor that extracts the part image of the analysis-target part of the face from a facial image including the analysis-target part of the face; and a subject guider that guides an imaging state of the subject based on the part information acquired, the part image extracted, and a target value of the characteristic corresponding to the part information.

(2) The characteristic is a luminance value indicating luminance of the part, the target condition is that the luminance value falls within a target range, and depending on the analysis-target part of the face, the subject guider guides the imaging state of the subject such that the luminance value falls within the target range.

(3) The characteristic is a way the part is illuminated, and depending on the analysis-target part of the face, the subject guider guides the imaging state of the subject such that a way the face is illuminated by an illumination for illuminating the face is changed.

(4) The way of illumination is a direction in which the part is illuminated, the target condition is that the direction in which the part is illuminated falls within a predetermined range of a target direction, and depending on the analysis-target part of the face, the subject guider guides the imaging state of the subject such that the direction in which the face is illuminated by the illumination falls within the predetermined range of the target direction of the illumination.

(5) The part information acquirer acquires the part information on a plurality of the analysis-target parts, the storage records a target value of the characteristic for each of the plurality of analysis-target parts, and the subject guider guides the imaging state of the subject such that the plurality of analysis-target parts approach the target values of the characteristics, respectively.

(6) The target value of the characteristic is a target range of a value of the characteristic, the target condition of the characteristic is that the characteristic falls within the target range, the storage records different target ranges for an identical characteristic, the different target ranges being different between a case where the analysis-target part is a single analysis-target part and a case of the plurality of analysis-target parts, and depending on whether a number of the analysis-target parts is one or more than one, the subject guider changes the target range to be used for guidance.

(7) The subject guider compares the imaging state of the subject before guidance with the imaging state after the guidance, and changes a method for guiding the imaging state of the subject depending on a comparison result.

(8) The subject guider stores a past imaging state of the subject, and guides the imaging state of the subject such that the imaging state is equal to the past imaging state stored.

(9) An imaging guidance method according to an embodiment of the present disclosure is executed by a computer, and includes: storing, for each part of a face, a target condition of a characteristic of a part image being a captured image of the part; acquiring part information related to an analysis-target part of a face of a subject; extracting the part image of the analysis-target part of the face from a facial image including the analysis-target part of the face; and guiding an imaging state of the subject based on the part information acquired, the part image extracted, and a target value of the characteristic corresponding to the part information.

(10) A program according to an embodiment of the present disclosure causes a computer to execute: storing, for each part of a face, a target condition of a characteristic of a part image being a captured image of the part; acquiring part information related to an analysis-target part of a face of a subject; extracting the part image of the analysis-target part of the face from a facial image including the analysis-target part of the face; and guiding an imaging state of the subject based on the part information acquired, the part image extracted, and a target value of the characteristic corresponding to the part information.

Although the exemplary embodiments of the present disclosure have been described in detail above, the present disclosure is not limited to the specific embodiments described above, and various modifications and variations can be made within the scope of the gist of the present disclosure described in the claims.

The disclosure of Japanese Patent Application No. 2021-162948, filed on Oct. 1, 2021, including the specification, drawings and abstract, is incorporated herein by reference in its entirety.

REFERENCE SIGNS LIST

100 Imaging guidance apparatus
101 Storage apparatus
102 Processor
103 User interface apparatus
104 Communication apparatus
110 Image acquirer
111 Display controller
112 Part information acquirer
113 Part image extractor
114 Subject guider

The invention claimed is:

1. An imaging guidance apparatus, comprising:
a storage that stores, for each part of a face, a target condition of a characteristic of a part image being a captured image of the part;
a part information acquirer that acquires part information related to an analysis-target part of a face of a subject;
a part image extractor that extracts the part image of the analysis-target part of the face from a facial image including the analysis-target part of the face; and
a subject guider that guides an imaging state of the subject based on the part information acquired, the part image extracted, and a target value of the characteristic corresponding to the part information, wherein
the characteristic is a direction of illumination to the analysis target part, and
the subject guider guides the imaging state of the subject such that the direction of the illumination is changed depending on the analysis-target part of the face.

2. The imaging guidance apparatus according to claim 1, wherein:
the characteristic is a luminance value indicating luminance of the part,
the target condition is that the luminance value falls within a target range, and depending on the analysis-target part of the face, the subject guider guides the imaging state of the subject such that the luminance value falls within the target range.

3. The imaging guidance apparatus according to claim 2, wherein:
the part information acquirer acquires the part information on a plurality of the analysis-target parts,
the storage records a target value of the characteristic for each of the plurality of analysis-target parts, and
the subject guider guides the imaging state of the subject such that the plurality of analysis-target parts approach the target values of the characteristics, respectively.

4. The imaging guidance apparatus according to claim 3, wherein:
the target value of the characteristic is a target range of a value of the characteristic,
the target condition of the characteristic is that the characteristic falls within the target range,
the storage records different target ranges for an identical characteristic, the different target ranges being different between a case where the analysis-target part is a single analysis-target part and a case of the plurality of analysis-target parts, and
depending on whether a number of the analysis-target parts is one or more than one, the subject guider changes the target range to be used for guidance.

5. The imaging guidance apparatus according to claim 1, wherein:
the way of illumination is a direction in which the part is illuminated,
the target condition is that the direction in which the part is illuminated falls within a predetermined range of a target direction, and
depending on the analysis-target part of the face, the subject guider guides the imaging state of the subject such that the direction in which the face is illuminated by the illumination falls within the predetermined range of the target direction of the illumination.

6. The imaging guidance apparatus according to claim 1, wherein
the subject guider compares the imaging state of the subject before guidance with the imaging state after the guidance, and changes a method for guiding the imaging state of the subject depending on a comparison result.

7. The imaging guidance apparatus according to claim 1, wherein
the subject guider stores a past imaging state of the subject, and guides the imaging state of the subject such that the imaging state becomes equal to the past imaging state stored.

8. The imaging guidance apparatus, according to claim 1, wherein
the analysis-target part of the face is a wrinkle, and
the subject guider guides the imaging state of the subject such that the direction of the illumination is changed depending on a type of the wrinkle.

9. The imaging guidance apparatus, according to claim 8, wherein
the wrinkle extends laterally on the forehead of a subject, and
the subject guider guides the imaging state of the subject such that the direction of the illumination is a vertical direction.

10. The imaging guidance apparatus, according to claim 8, wherein the wrinkle extends vertically between the eyebrows of a subject, and the subject guider guides the imaging state of the subject such that the direction of the illumination is a horizontal direction.

11. An imaging guidance method executed by a computer, comprising:

storing, for each part of a face, a target condition of a characteristic of a part image being a captured image of the part;

acquiring part information related to an analysis-target part of a face of a subject;

extracting the part image of the analysis-target part of the face from a facial image including the analysis-target part of the face; and guiding an imaging state of the subject based on the part information acquired, the part image extracted, and a target value of the characteristic corresponding to the part information, wherein the characteristic is a direction of illumination to the analysis target part, and the guiding further comprises guiding the imaging state of the subject such that the direction of the illumination is changed depending on the analysis-target part of the face.

12. A non-transitory computer readable medium storing an executable program, which when executed by a processor causes a computer to execute:

storing, for each part of a face, a target condition of a characteristic of a part image being a captured image of the part;

acquiring part information related to an analysis-target part of a face of a subject;

extracting the part image of the analysis-target part of the face from a facial image including the analysis-target part of the face; and guiding an imaging state of the subject based on the part information acquired, the part image extracted, and a target value of the characteristic corresponding to the part information, wherein the characteristic is a direction of illumination to the analysis target part, and the guiding further comprises guiding the imaging state of the subject such that the direction of the illumination is changed depending on the analysis-target part of the face.

* * * * *